(12) United States Patent
Bareket

(10) Patent No.: US 6,655,722 B2
(45) Date of Patent: Dec. 2, 2003

(54) LOADING ARC FOR PICKUP TRUCK

(75) Inventor: Asaf Bareket, Ramat Gan (IL)

(73) Assignee: Asaf Metal (1997) Ltd., Ramat Gan (IL)

( * ) Notice: Subject to any disclaimer, the term of this patent is extended or adjusted under 35 U.S.C. 154(b) by 0 days.

(21) Appl. No.: 09/946,837

(22) Filed: Sep. 6, 2001

(65) Prior Publication Data

US 2002/0036412 A1 Mar. 28, 2002

(30) Foreign Application Priority Data

Sep. 7, 2000 (IL) ................................. 138317

(51) Int. Cl.[7] .................................................. B60P 3/00
(52) U.S. Cl. ........................................... 296/3; 224/405
(58) Field of Search ............................... 296/3; 224/405

(56) References Cited

U.S. PATENT DOCUMENTS

| | | |
|---|---|---|
| 3,891,262 A | 6/1975 | Brunel |
| 4,057,281 A | 11/1977 | Garrett |
| 4,138,046 A | 2/1979 | De Freze |
| 4,152,020 A | 5/1979 | Brown et al. |
| 4,405,170 A | 9/1983 | Raya |
| 4,565,402 A | 1/1986 | Hopkins |
| 4,659,131 A | 4/1987 | Flournoy, Jr. |
| 4,770,458 A * | 9/1988 | Burke et al. |
| 4,854,628 A * | 8/1989 | Halberg |
| 5,002,324 A * | 3/1991 | Griffin |
| 5,316,190 A * | 5/1994 | Bullock |
| 5,431,472 A | 7/1995 | Coffland |
| 5,451,083 A | 9/1995 | Tayar |
| 5,560,666 A | 10/1996 | Vieira et al. |
| 5,836,635 A | 11/1998 | Dorman |

* cited by examiner

Primary Examiner—Stephen T. Gordon
Assistant Examiner—Scott Carpenter
(74) Attorney, Agent, or Firm—Browdy and Neimark, P.L.L.C.

(57) ABSTRACT

A versatile loading arc system for a pickup truck comprising a bed extending between a front end adjacent the truck's cabin and a rear end and two side walls, the system comprising a front arc having a top bar extending between two side legs fixed at a front end of the bed and a rear arc having a top bar ending between two side legs. The rear arc is swingably supported by two swinging arms each pivotally hinged to sides of the bed at a location intermediate the rear end and the front end of the bed. The rear arc is swingably displaceable between a front position in which it adjoins the front arc, and at least one rear position in which it extends parallel at or adjacent the rear end of the bed.

15 Claims, 5 Drawing Sheets

LOADING ARC FOR PICKUP TRUCK

FIELD OF THE INVENTION

The present invention is generally in the field of loading arcs for pickup trucks and more specifically the invention is concerned with a versatile loading arc system.

The term "loading arc" as used in the specification is often referred to also as a utility rack, support rack, carrying rack, turnover bars, etc.

BACKGROUND OF THE INVENTION

Pickup tucks are those vehicles which are formed with a driver/passenger cabin and a cargo bed disposed behind the cabin. Typically these beds are open beds though different arrangements are provided for temporarily or fixedly closing or covering the bed.

It is highly desirable by pickup truck owners to install loading arcs on the bed for effectively and conveniently carrying of cargo, in particular long items such as pipes, sheets of material, ladders, boards of material such as wood, gypsum boards, etc. For that purpose, many trucks are installed with different utility racks for supporting such cargo at an elevated position, so that the cargo may extend forward of the bed if it is longer than the length of the bed. This arrangement is also suitable for carrying such cargo when other equipment is carried on the bed's floor surface.

The loading arcs serve also as a safety means where they typically extend at least slightly above the height of the cabin thus serving also as a turnover bow for preventing deformation of the cabin in case of turnover of the truck.

Still another aspect of the loading arcs is their eye-pleasing appearance and for that purpose it is well known to provide loading arcs made of polished stainless steel or of profiled material coated with nickel, etc.

At times, when no cargo is being carried, the loading arcs are not necessary and at such circumstances it may be advantageous to have a loading arc system which may be easily dismantled, or a system in which the loading arc comprises a front fixed arc and a rear collapsible or movable arc which may be moved to a forward position adjacent the front arc.

A large variety of loading arcs and different utility racks are known, some of which provide some versatility between a utility position in which the arcs are separated apart from one another, namely, a front arc at a front end of the bed and a rear arc at the rear end of the bed, and a leisure state in which the rear arc is displaced to a collapsed position within the bed, or in which it is completely removed or displaced to a forward position adjacent the front arc. Other arrangements provide a carrying arc system consisting of a plurality of various bars and connecting members which may be assembled in several different positions. However, these arrangements have the disadvantageous of requiring some knowledge or technical sense, the use of work tools and a significant time to change between positions.

The following is a list of prior art which is concerned with carrying arcs for utility trucks:

U.S. Pat. Nos. 3,891,262, 4,057,281, 4,138,046, 4,152,020, 4,405,170, 4,565,402, 4,659,131, 4,770,458, 5,431,472, 5,451,083, 5,560,6665, 5,836,635.

It is an object of the present invention to provide a loading arc system for a pickup truck versatile between at least two positions, one of which being a collapsed position in which the rear arc is displaced to a forward position adjacent the front arc, and a second position in which the rear arc is at a rear position at or adjacent a rear end of the pickup truck bed.

SUMMARY OF THE INVENTION

According to the present invention there is provided a versatile loading arc system for a pickup tuck in which a front arc is fixedly attached at a front end of the bed and a rear arc is swingably displaceable between a first position in which it is adjacent the front arc and at least one rear position in which it is at or adjacent a rear end of the bed.

According to the present invention there is provided a versatile loading arc system for a pickup trick truck having a bed extending between a front end adjacent the truck's cabin and a rear end and two side walls, the system comprising a front arc having a top bar extending between two side legs fixed at a front end of the bed; and a rear arc having a top bar extending between two side legs and being swingably supported by two swinging arms each pivotally hinged to sides of the bed at a location intermediate the rear end and the front end of the bed; the rear arc being swingably displaceable between a front position in which it adjoins the front arc, and at least one rear position in which it extends parallel at or adjacent the rear end of the bed.

The arc may extend from the floor of the bed or may extend from side walls of the bed, either directly fixed thereto or articulated to side bars which in turn are attached to the side walls of the bed.

The swinging arms are pivotally hinged at about a mid portion of the bed whereby swinging the rear arc about the swinging arms entails displacement thereof about an arcuate path which essentially parallel to a longitudinal axis of the vehicle whereby the swinging arms pivot about an axis essentially parallel to the vehicle's cabin.

According to one specific embodiment, the swinging arms are telescopically extendable between a retracted position and a protracted position thereby enabling the rear arc to be displaced into more than one rear position. Typically the length of swinging arms is fixable.

By still a particular design of the invention, the bar of the rear arc is pivotally hinged to the swinging arms.

BRIEF DESCRIPTION OF DRAWINGS

For better understanding the invention and to see how it may be carried out in practice, the invention will now be described, in a non-limiting manner with reference to the accompanying figures, in which.

DETAILED DESCRIPTION OF THE INVENTION

Figure 1:
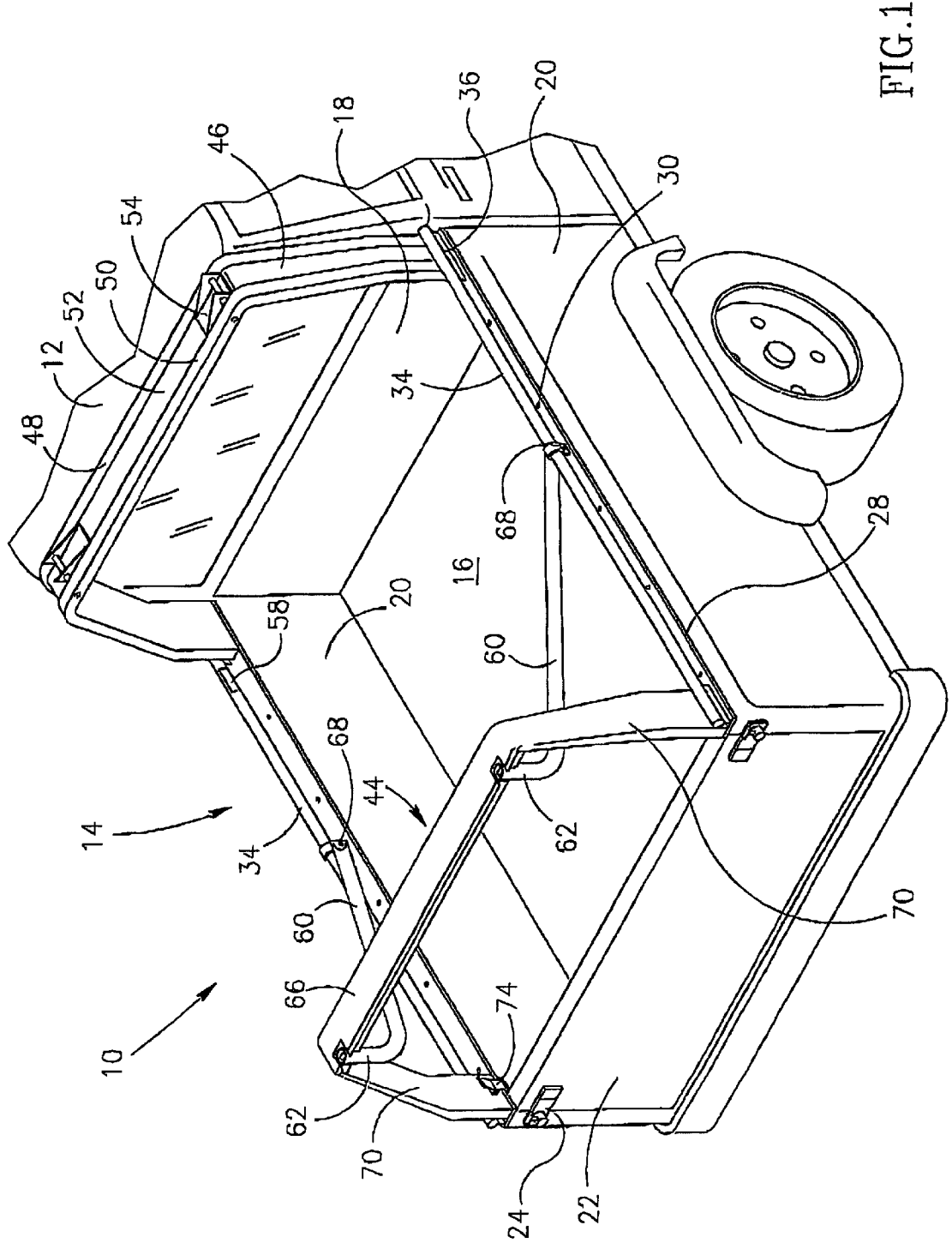
FIG. 1 is a perspective, rear view of a pickup truck fitted with a loading arc system in accordance with the invention, the assembly in its extended position.

Reference is first being made to FIG. 1 of the drawings in which a pickup truck generally designated 10 is illustrated in which the driver/passenger cabin 12 is partially removed. Extending behind the cabin 12 there is the truck's bed 14 having a bed floor 16, a front wall 18, two parallel side walls 20 and a rear door 22 pivotally connected to floor 16 and Singable at hinges 24 as known per se.

A connecting bar 28 is detachably secured at a top edge of each of side walls 20 by means of bolts 30. Fixed to each connecting bar. 28 there is a side bar 34 supported by several brackets 36. Each of side bars 34 is formed with a front indention 38 and a rear indention 40, serving as receptacle engaging a bottom end of the rear arc 44, in its front and rear positions, respectively, as will be become apparent hereinafter.

Fixedly extending from the connecting bars 28, at their front most ends, there is a front arc 46, the height of which slightly extends beyond the height of cabin 12. The front arc 46 in fact is formed of two bent rails 48 and 50 with a support board 52 therebetween. Formed on the top portion of the front arc 46 there is a pair of stoppers (at times referred to also as support members) 54 displaceable between an erect position (FIG. 4B) and a collapsed position (the remaining figures). Although not shown, it will be appreciated that the rear arc 44 may just as well be provided with stoppers as described in connection with the front art 46.

As depicted in the figures, the front arc 46 and the rear arc 44 are formed with a top bar and two side legs which in the present embodiments are integral. However, it may be appreciated that the side legs may be separate from the top bar and be detachably connected thereto for disassembly. Furthermore, each of the top and rear arc may be made of a single profiled bar rather than a pair of bars as illustrated in connection with the front arc 46.

Figure 3:
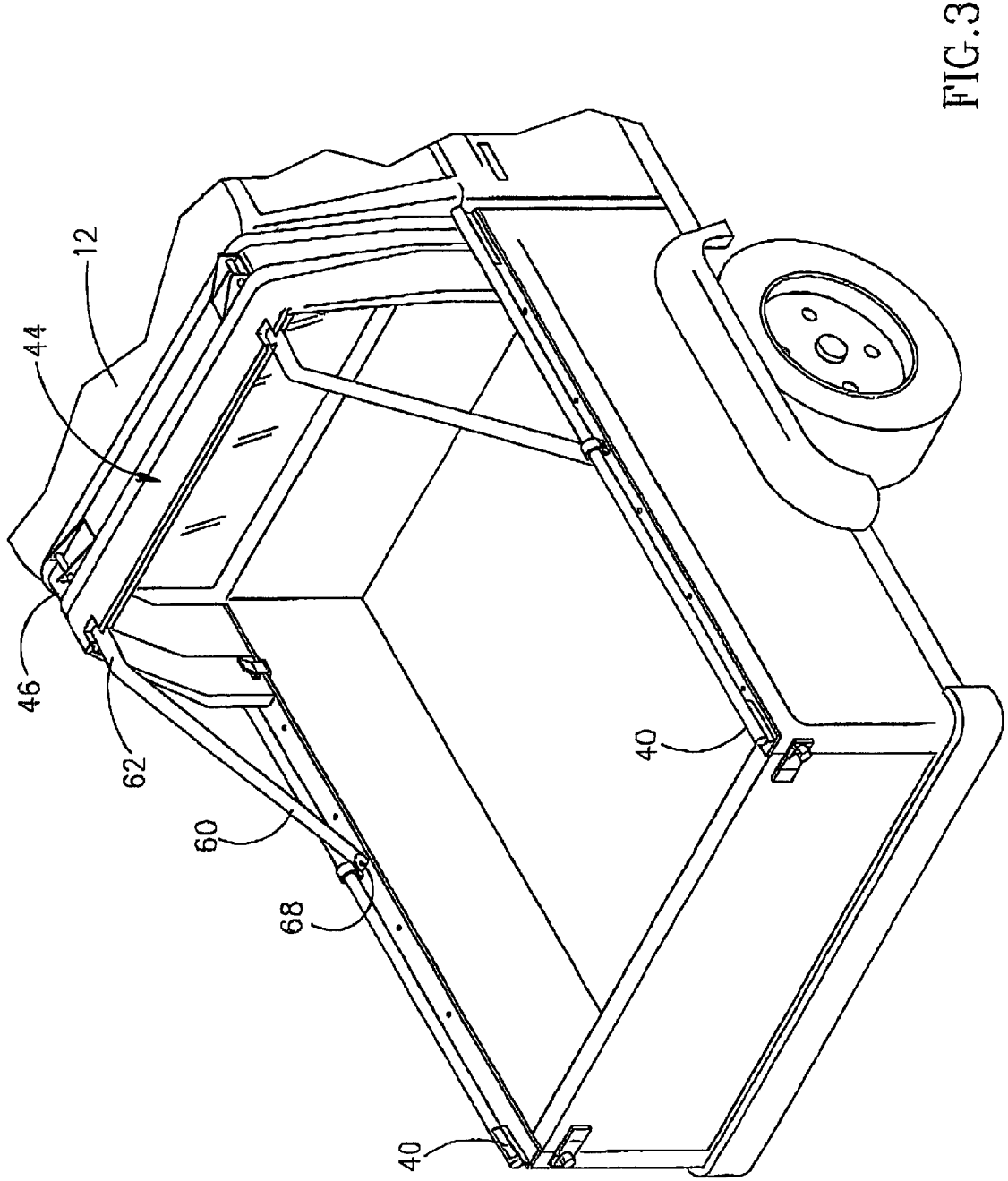
FIG. 3 illustrates the loading arc system in its collapsed position.

The rear arc 44 is swingably supported by two swinging arms 60, each having a top end 62 pivotally connected to the top bar 66 of the rear arc 44, and a bottom portion hinged at 68 to the side bars 34. Side legs 70 of the rear arc 44 are formed at a bottom portion thereof with an engagement latch 74 engageable with the connecting bar 28 at either its rear position (FIG. 1) or its front position (FIG. 3). It is to be noted that the swinging arms 60 may alternatively be pivotally connected to the side legs 70 of the rear arc 44, rather then to the top bar 66.

Figure 2:
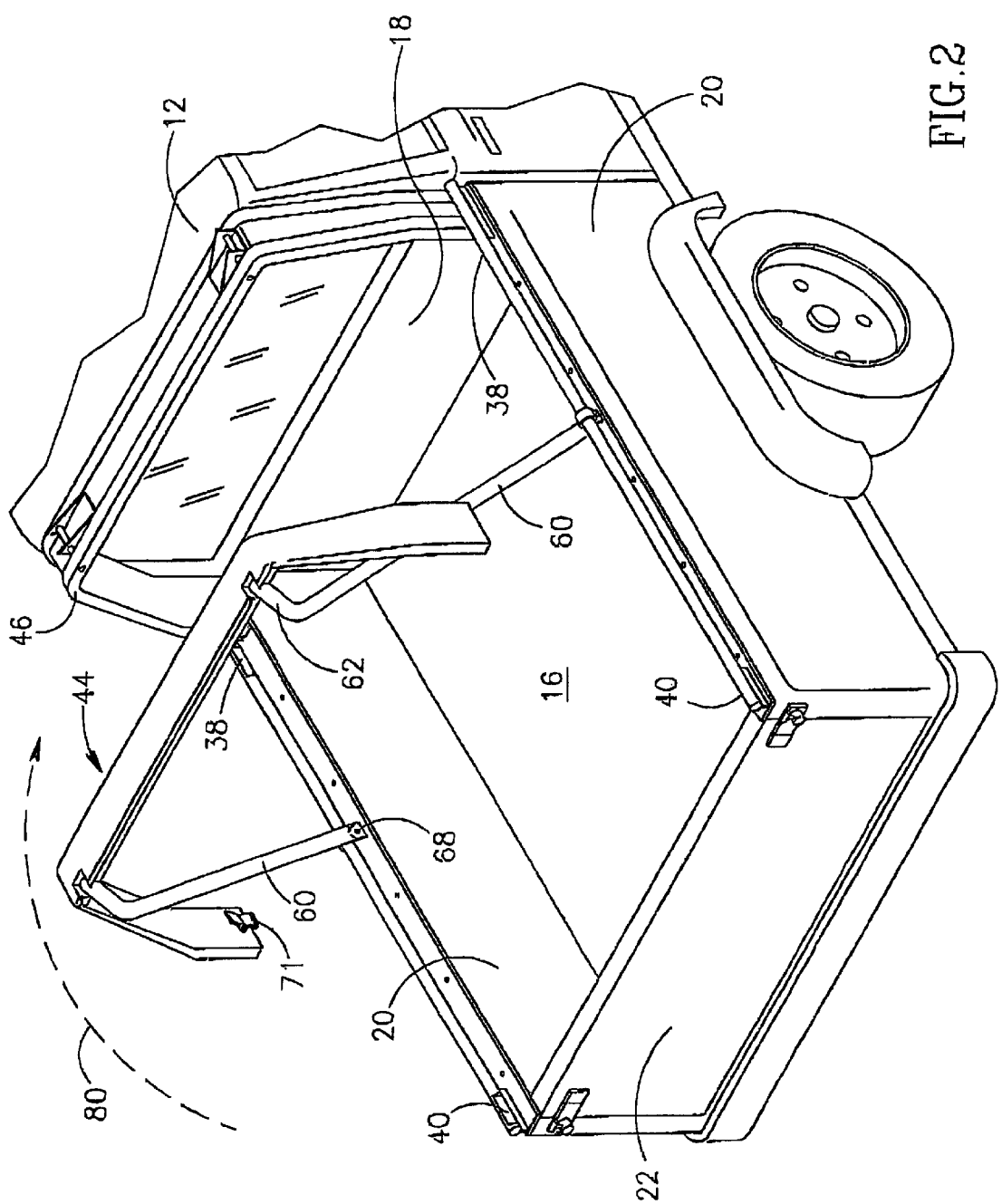
FIG. 2 is a perspective view illustrating the assembly in a mid position towards collapsing the loading arc system.

The rear arc 44 is shiftable between its rear position (FIG. 1) and its front position (FIG. 3). For shifting between positions, latches 74 are depressed so as to disengage from the connecting bars 28 whereby the rear arc 44 may be swingably displaced along arcuate path represented by dashed line 80 in FIG. 2, into its front position, wherein bottom ends of legs 70 are received within indentions 38 of the side bars 34 and the latches 74 spontaneously engage with the connecting bars 28. It is appreciated that the rear arc swingably displaces along a path having a radi defined by the effective length of the support arms 60.

As seen in FIG. 3, the rear arc 44, at its front position, blends with the front arc 46 in an eye pleasing manner. In this position, swinging arms 60 have their top portion 62 extending essentially horizontally.

Although not illustrated, the artisan will appreciates that the rear arc 44 may also be fitted with stoppers 54 as illustrated in connection with the front arc 46.

Figure 4A:
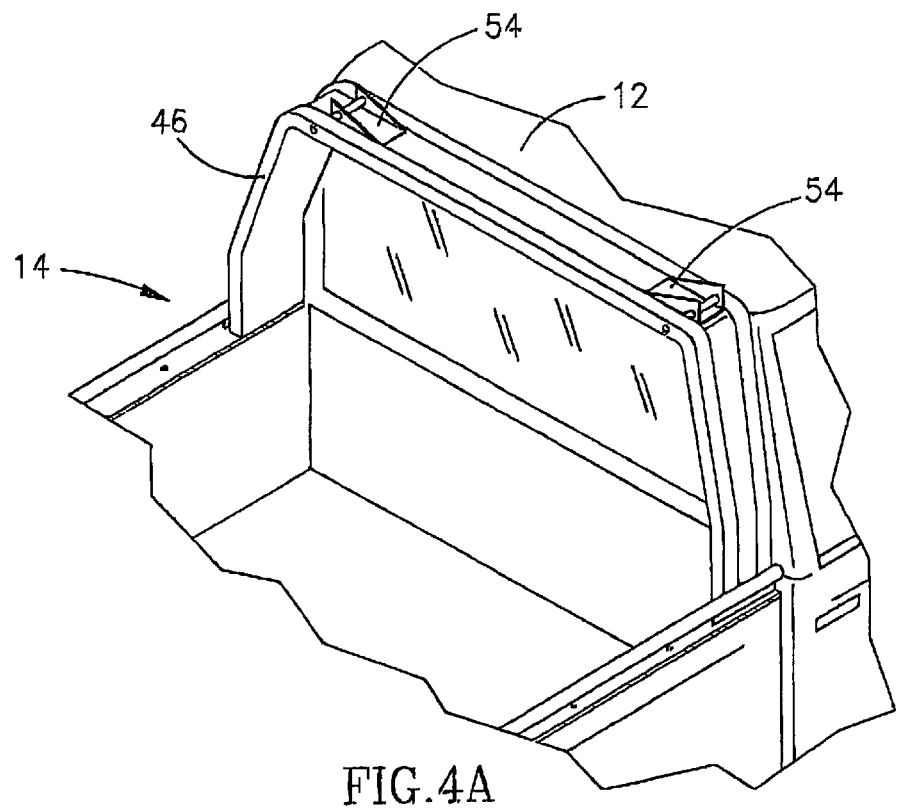
FIGS. 4A and 4B illustrate the front loading arc, in which support members are provided in a collapsed state and in an erect state fitted with a tensioning strap.
Figure 4B:
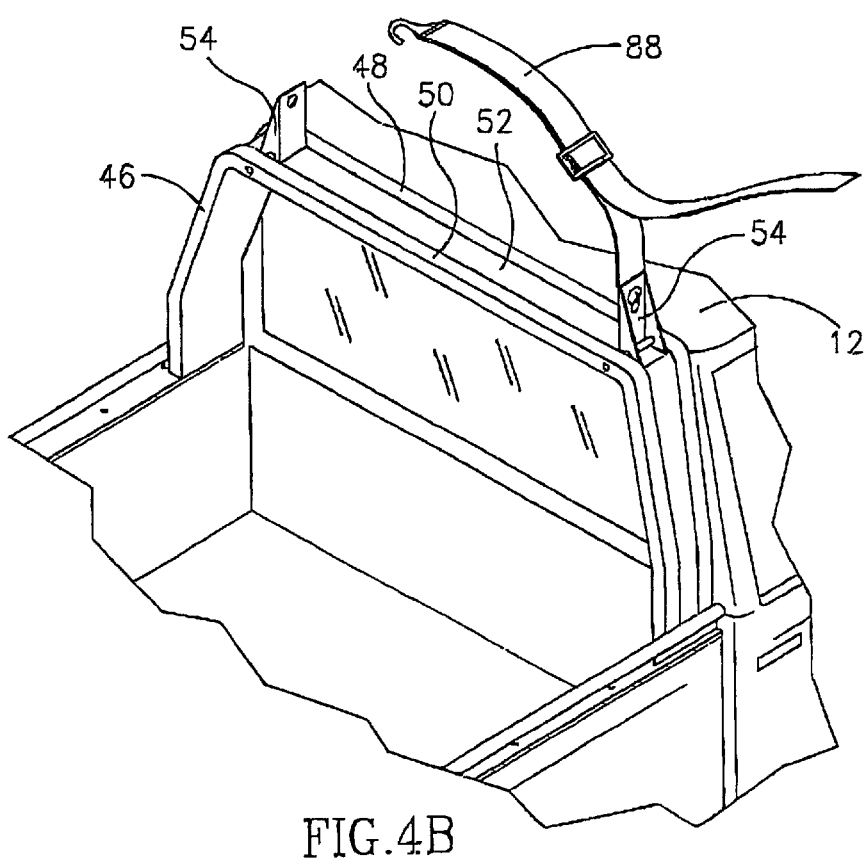

FIG. 4A illustrates only the front portion of the truck's bed wherein the front arc 44 is shown with its stoppers 54 in their collapsed position. In the position of FIG. 4B, the stoppers 54 are erected by supporting between them long cargo such as metal bars, boards of material, a ladder, etc. If required, a tension strap 88 may be provided which while not in use may be received in the indention formed between the two bars 48 and 50 of the front bar 44.

Figure 5:
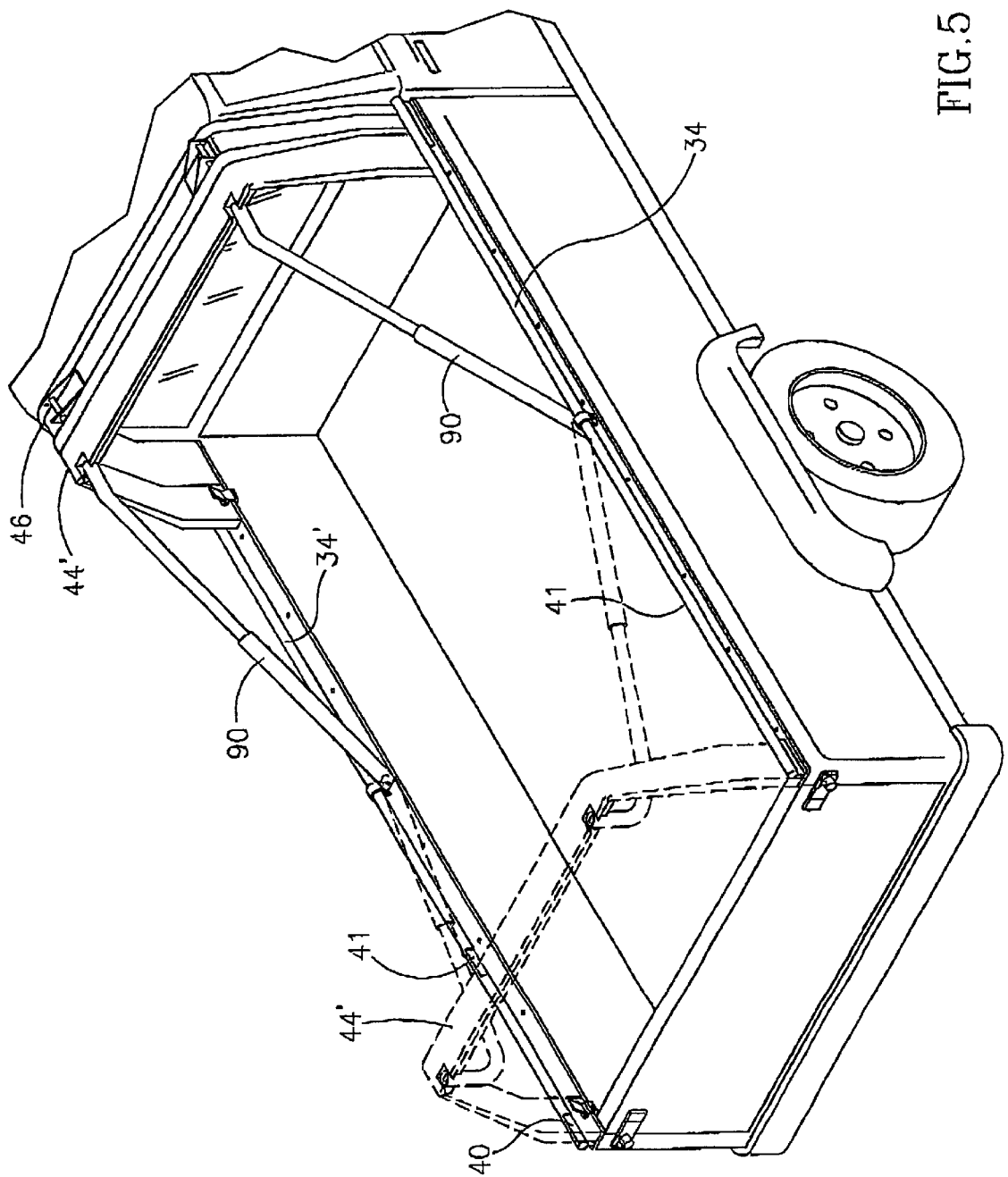
FIG. 5 illustrates an embodiment of the loading arc system in accordance with the invention illustrating, the system in its collapsed state and in a retracted state in dashed lines.

Turning now to FIG. 5, there is illustrated a further embodiment which is principally similar to the previous embodiments the difference residing in that the swinging arms 90 are telescopically extendible between a retracted position (as seen in solid lines, illustrating a front position of the rear arc 44') and at least one extended position illustrated by dashed lines in FIG. 5. Preferably, the length of arms 90 is fixable at each position thereof. It is thus appreciated that the rear arc 44' may be positioned at a different location rather than at the very end of the bed 14, depending on the size of cargo to be carried and on other considerations. For that purpose, it is desirable that the side bar 34' be formed with at least another pair of receptacle indentions 41 similar to indentions 40 in FIG. 1.

It will be appreciated by a person versed in the art that other embodiments and arrangements may be provided, which do not depart from the scope of the invention as described hereinabove by way of example only.

What is claimed is:

1. A versatile loading arc system for a pickup truck having a bed extending between a front end adjacent the truck's cabin and a rear end, said bed being defined by the rear end, the front end, and two side walls, the system comprising a front arc having a top bar extending between two side legs secured at the front end of the bed; and a rear arc having a top bar extending between two side legs, said rear arc being connected to two swinging arms which are capable of rotating with respect to the side walls at a location intermediate the rear end and the front end of the bed; the top bar of the rear arc being connected to said swinging arms for translation displacement of the rear arc between a front position, in which the rear arc adjoins the front arc, and at least one rear position in which the rear arc extends parallel to the front arc at or adjacent the rear end of the bed;

wherein the left and right side walls defining the bed are each provided with a respective left and right connecting bar detachably secured to a top end of each of the respective side walls, and further wherein the side legs of the front and rear arcs extend from the respective connecting bars; and wherein a side bar is attached to each of the connecting bars, the side bar extending essentially the length of the bed, and where each of the swinging arms is pivotally hinged to one of the respective side bars.

2. A loading arc system according to claim 1, wherein when the rear arc is in the front position the rear arc blends with the front arc.

3. A loading arc system according to claim 1, wherein the swinging arms are telescopically extendable between a retracted position and an at least one protracted position.

4. A loading arc system according to claim 1, wherein the top bar of at least the front arc is provided with a pair of stoppers displaceable between an erect position and a collapsed position.

5. A loading arc system according to claim 4, wherein at least the front arc is fitted with a tightening strap hingeable to the stoppers.

6. A loading arc system according to claim 1, wherein the top bar of the rear arc is pivotally hinged to the swinging arms.

7. A loading arc system according to claim 1, wherein each of the swinging arms is provided with a top end portion, configured such that when the rear arc is in its front position each of said top end portions are directed essentially horizontally, and when said rear arc is in one of its at least one rear positions said top end portion is directed essentially vertically.

8. A loading arc system according to claim 1, wherein the top bar and the side legs of the either or both the front and rear arcs, are integral.

9. A loading arc system according to claim 1, wherein the rear arc is swingably displaceable along an arcuate path, which is parallel to a longitudinal axis of the truck.

10. A loading arc system according to claim 1, wherein the side bars each are formed with receptacle portions for receiving a respective bottom portions of each of the side legs of the rear arc when it is in its respective front or rear positions.

11. A loading arc system according to claim 1 wherein each of the side legs of the rear arc comprise at their bottom ends an engaging means for releasable engagement with each of the respective connecting bars, when the rear arc is in its front or at least one rear position.

12. A versatile loading arc system for a pickup truck having a bed extending between a front end adjacent the truck's cabin and a rear end, said bed being defined by the rear end, the front end, and two side walls, the system comprising a front arc having a top bar extending between two side legs secured at the front end of the bed; and a rear arc having a top bar extending between two side legs, said rear arc being connected to two swinging arms which are capable of rotating with respect to the side walls at a location intermediate the rear end and the front end of the bed; the top bar of the rear arc being connected to said swinging arms for translational displacement of the rear arc between a front position, in which the rear arc adjoins the front arc, and at least one rear position in which the rear arc extends parallel to the front arc at or adjacent the rear end of the bed; and wherein the side legs of one or both of the front and rear arcs are made of a pair of profiled members with a support board secured therebetween; and wherein the left and right sidewalls defining the bed are each provided with a respective left and right connecting bar detachably secured to a top end of each of the respective side walls and further wherein the side legs of the front and rear arcs extend from each of the respective connecting bars; and wherein a side bar is attached to each of the connecting bars, the side bar extending essentially the length of the bed, and where each of the swinging arms is pivotally hinged to one of the respective side bars.

13. A loading arc system according to claim 12, wherein the side bars are each formed with receptacle portions for receiving a respective bottom portions of each of the side legs of the rear arc when it is in its respective front or rear positions.

14. A loading arc system according to claim 12, wherein when the rear arc is in the front position, the rear arc blends with the front arc.

15. A loading arc system according to claim 12, wherein each of the side legs of the rear arc comprise at their bottom ends an engaging means for releasable engagement with each of the respective connecting bars, when the rear arc is in its front or at least one rear position.

* * * * *